April 19, 1966     L. GAUTHIER     3,247,087
ELECTROLYTIC MACHINING SYSTEM AND METHOD
Filed Dec. 17, 1962     6 Sheets-Sheet 1

INVENTOR

LUCIEN GAUTHIER

April 19, 1966  L. GAUTHIER  3,247,087
ELECTROLYTIC MACHINING SYSTEM AND METHOD
Filed Dec. 17, 1962  6 Sheets-Sheet 2

INVENTOR
LUCIEN GAUTHIER

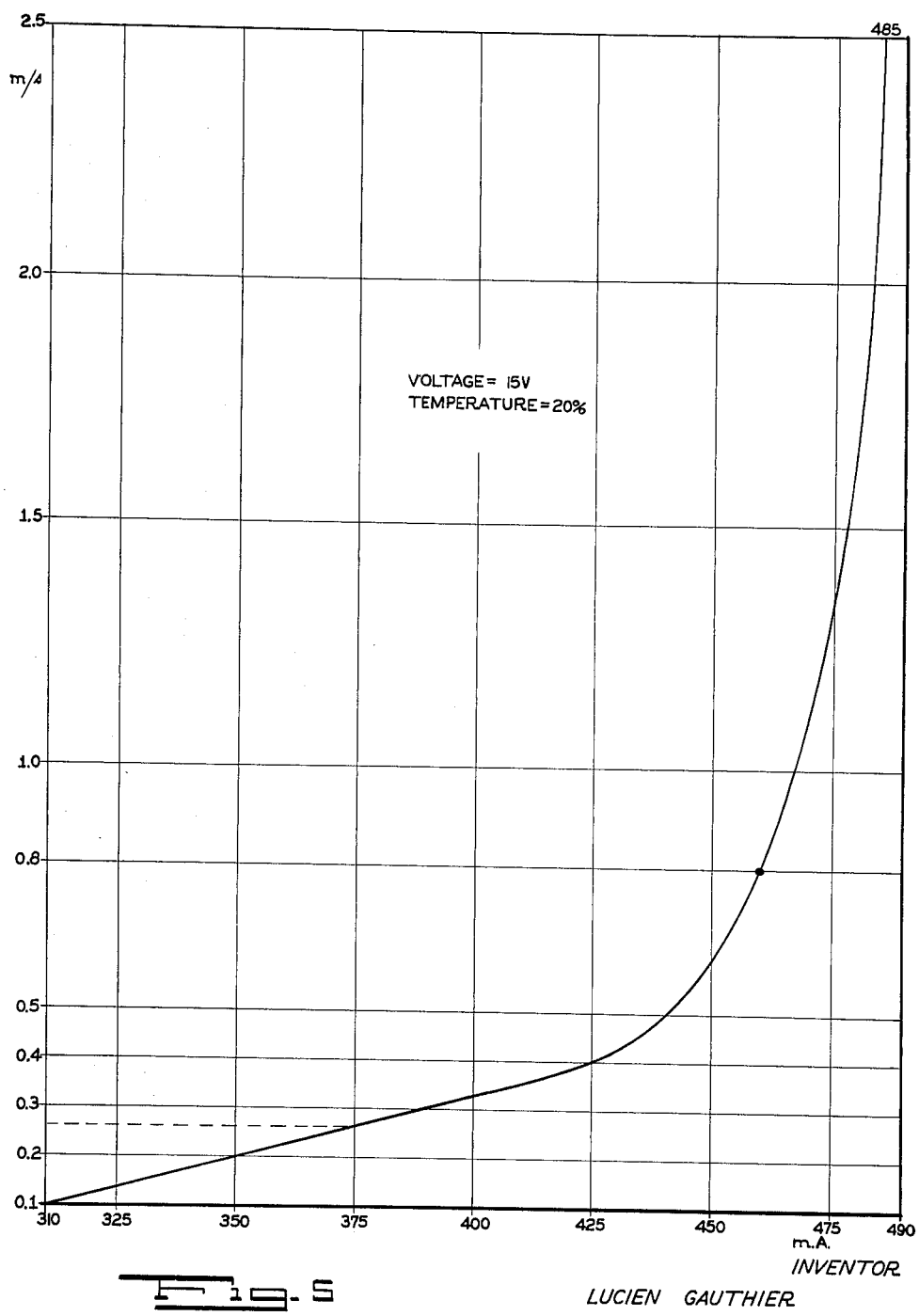

April 19, 1966 L. GAUTHIER 3,247,087
ELECTROLYTIC MACHINING SYSTEM AND METHOD
Filed Dec. 17, 1962 6 Sheets-Sheet 4
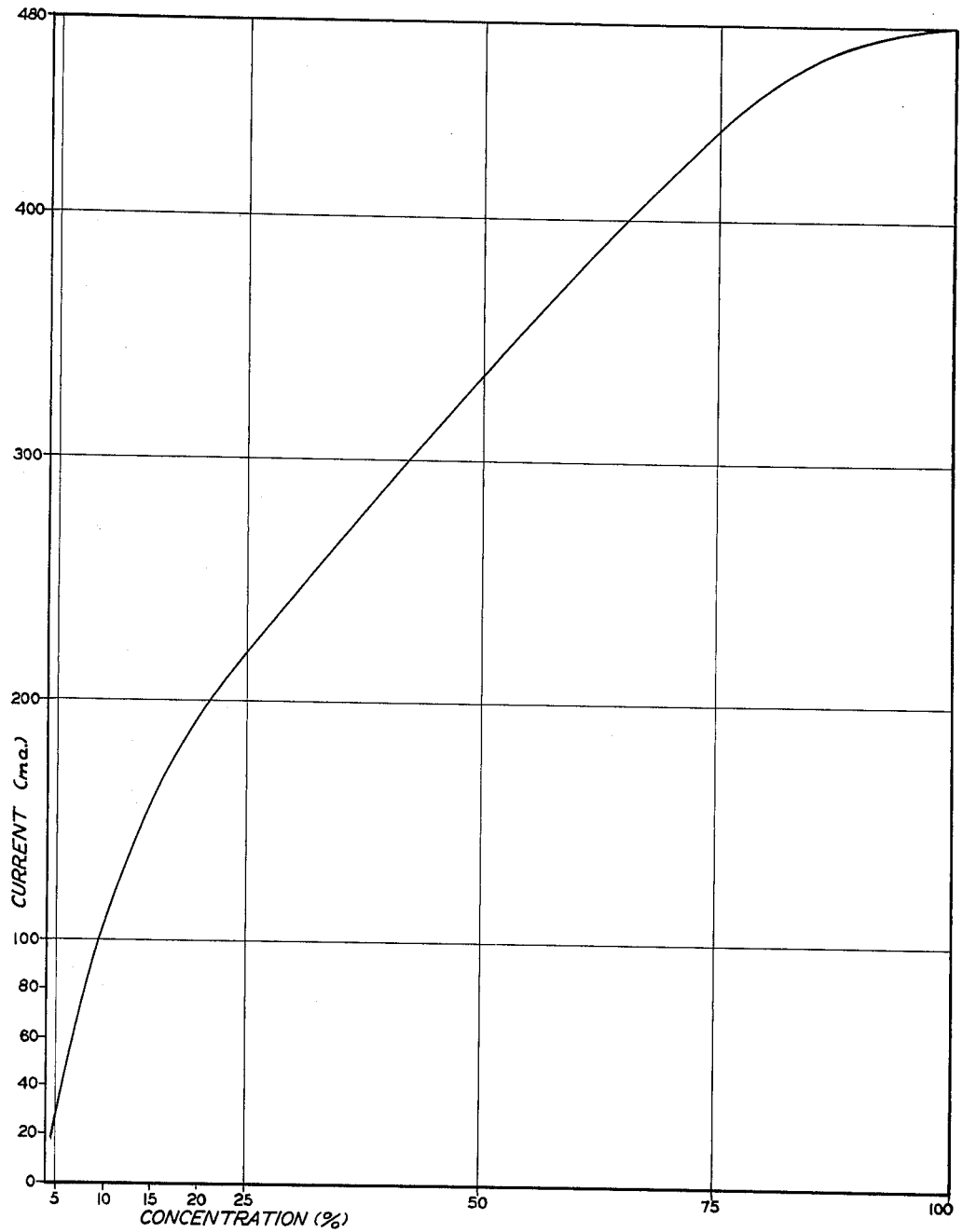
INVENTOR
LUCIEN GAUTHIER April 19, 1966  L. GAUTHIER  3,247,087
ELECTROLYTIC MACHINING SYSTEM AND METHOD
Filed Dec. 17, 1962  6 Sheets-Sheet 6
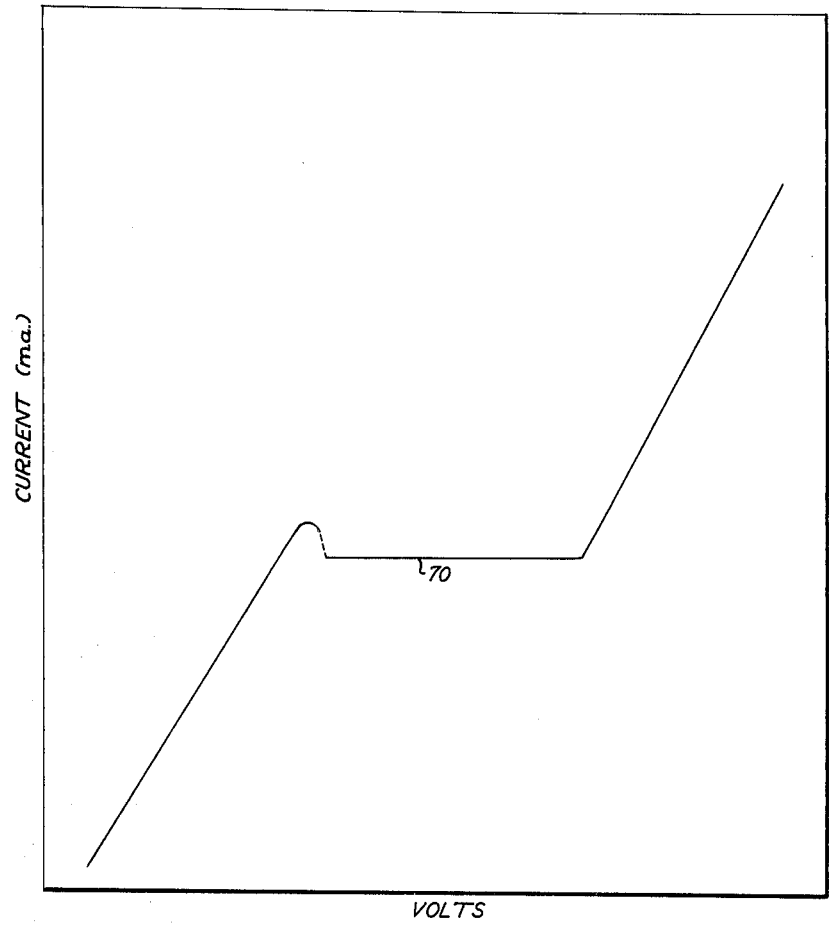
INVENTOR
LUCIEN GAUTHIER

United States Patent Office 3,247,087
Patented Apr. 19, 1966

3,247,087
ELECTROLYTIC MACHINING SYSTEM
AND METHOD
Lucien Gauthier, La Varenne St. Hilaire, France, assignor to Societe Anonyme Ateliers de Construction Lavalette, Saint-Ouen, France
Filed Dec. 17, 1962, Ser. No. 245,161
Claims priority, application France, Apr. 19, 1957, 736,807, Patent 1,171,763
11 Claims. (Cl. 204—143)

This application is a continuation-in-part of my earlier filed, copending application, Serial No. 729,481 of April 18, 1958, now abandoned.

This invention relates to electrolytic machining processes and more particularly to processes wherein metal is removed from closely determined areas of a metallic workpiece by passing electric current between a cathode spaced from the workpiece and the workpiece itself which serves as an anode, the current being passed through a liquid electrolyte contacting said cathode and said workpiece.

An object of the invention is to provide an improved electrolytic machining technique which will either permit conventional machining operations to be carried out more advantageously, owing to the fact that, e.g., reproducibility of the machining operations is improved, that automation thereof is facilitated, that their cost price is reduced, etc., or which will permit machining operations to be carried out which were not practicable by means of existing machining methods.

According to the invention, there is provided a treating zone in which a workpiece is supported, a source of electrolyte, a closed flow circuit for said electrolyte from the source through said zone and back to the source, the circuit including pumping means and means for adjusting the flow rate and temperature of the electrolyte, a cathode supported in said zone in spaced relation to said work, and means applying a negative potential to said cathode and a positive potential to said work. The circuit preferably includes a filter for the electrolyte, and at least one storage reservoir therefor.

According to further features of the invention, means are provided in the treating zone for channelling the electrolyte towards a predetermined area of the workpiece at a substantial velocity.

According to a preferred embodiment, a separator of insulating material is interposed in the treating zone between the cathode and the workpiece and said separator is formed with perforate means which may include one or more apertures or a porous portion, adjacent the predetermined area against which the electrolyte is to be channelled or directed for removing metal therefrom. Further, it is provided according to a modification of the invention that the channelling means, such as the perforate or porous portion of the separator, may have a relative movement imparted to it with respect to the work to achieve uniform metal removal over a comparatively wide area of the workpiece.

The characteristics feature of the technique of the invention is that it involves principles which are in direct contrast to those of electrolysis wherein a workpiece is immersed in a bath. Although the technique of the invention involves immersing of the surface to be worked in a bath, the principles of the invention permit localized rather than general treatment of the surface such that closely determined areas can be removed by anodic dissolution.

An advantage of the invention is that closely controlled movement can be effected between the two employed electrodes, one of which may be constituted by the workpiece and/or a movable insulating screen may be employed which permits the machining of all possible types of surfaces of revolution. Moreover, the fact that an insulating screen can be employed in accordance with the invention provides for types of machining which would not normally be possible in an electrolytic bath.

The movement of the electrolyte, as is effected in accordance with the invention, advantageously permits the use of cathode surfaces which are smaller than the associated anode surfaces generally constituted by the workpieces. Moreover, the risk of sparking is avoided.

Advantageously, the electrolyte employed in accordance with the invention is non-toxic.

Furthermore, with an electrolyte being provided under the conditions to be specified hereunder, relatively low voltages can be employed. Moreover, the techniques of the invention enable a ready control of the electrolyte temperature which, as will be shown hereinafter, is an important feature of the invention.

Contrary to other techniques in which a workpiece is immersed in an electrolyte, substantial quantities of metal can be removed when methods of the invention are employed.

Still further, it is possible, in accordance with the invention, to gage the metal which is removed by the simple expedient of measuring the time of treatment, provided that the other parameters of the process are kept constant such as, for example, the nature of the metal, current density and the nature, speed and temperature of the electrolyte.

The use of a perforated screen, as is possible in accordance with the invention, permits of separately machining several areas immersed in the same electrolytic bath while permitting the other surfaces in said bath to remain uneffected.

In employing the methods of the invention with an electrolyte constituted by an aqueous salt solution, the metal removed from the workpiece being treated can be collected as a hydrate in suspension which is readily removed by filtering or centrifuging. Thus the composition of the electrolyte can be maintained constant and the electrolyte can be readily re-used. The consumption of electrolyte is limited to the small amount remaining on the parts being treated and therefore the process is very economical.

Advantageously, the methods of the invention are applicable to all metals and alloys, such as for example, aluminum, copper, steel and like metals and alloys thereof.

The above and further objects, features and advantages of the invention will appear from the following disclosure. In the accompanying drawings, relating to illustrative embodiments of the invention:

FIGS. 5, 6 and 7 are graphs illustrating certain characteristics of the technique of the invention;

FIG. 8 is a graph illustrating the prior art as contrasted to the invention;

Figure 1:
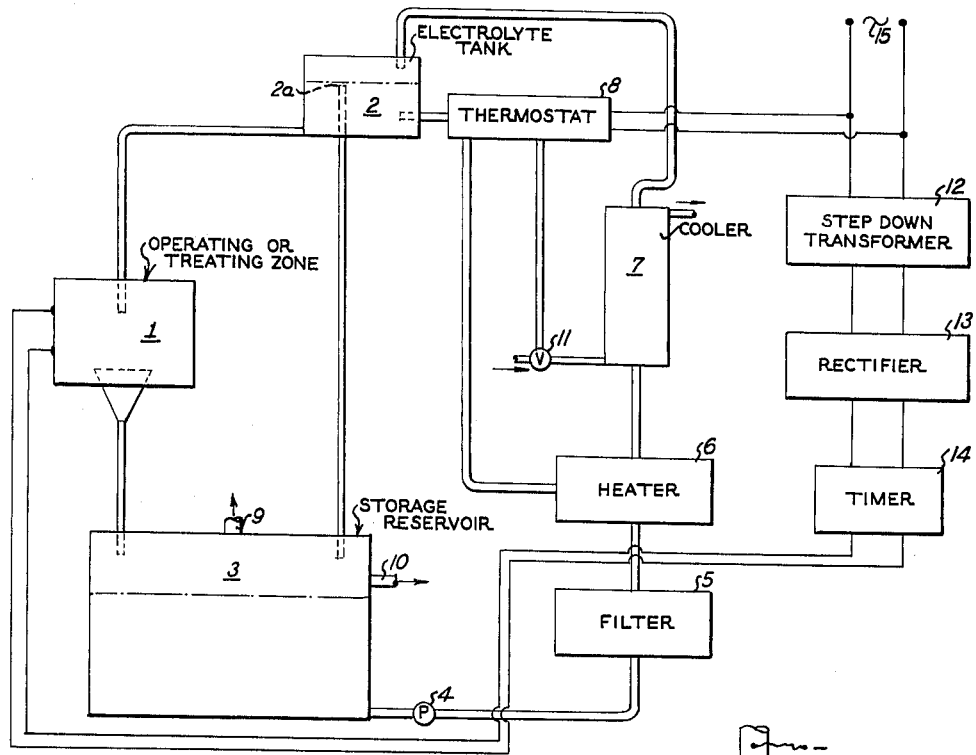
FIG. 1 is a flow diagram of an electrolytic machining system according to the invention.

Referring to FIG. 1, the system comprises an operating or treating zone schematically indicated at 1 and adapted to be supplied with electrolyte fluid from an overhead tank 2 having suitable means, such as an overflow pipe 2a, for maintaining a uniform adjustable liquid level therein. This permits controlling the flow velocity of the electrolyte through the operating zone 1.

Tank 2 is supplied from a storage reservoir 3 by means of a pump 4 and through a filter 5. Associated with the flow line between pump 4 and overhead tank 2 is a heater unit 6 and a cooler unit 7, and conventional means including a thermostat 8 are provided for so controlling the units 6 and 7 that the temperature of the fluid supplied to the tank 2 is maintained at an adjustable uniform value. Thus, for example, the thermostat 8 may be connected to control both the electric supply circuit for the heater 6 and a valve 11 controlling the supply of cooling fluid to the unit 7. A vent 9 is provided in the top of reservoir 3 for discharging any evolved gases. A side aperture 10 in the tank serves to separate off any supernatant oils and fatty substances which may be introduced into the system from the workpiece. The necessary electric power is derived from a suitable source such as the power supply network 15. Connected across said network is a stepdown transformer 12 followed by a rectifier 13 and a timer device 14 for controlling the time of application of electric power as required for each particular machining operation.

Figure 2:
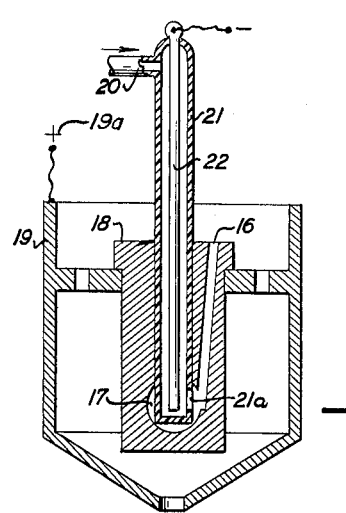
FIG. 2 is a detailed sectional view of a workpiece being treated in accordance with one embodiment of the invention.

FIG. 2 illustrates one embodiment of the treating zone 1 in FIG. 1, as used in a machining operation for removing burrs present at a junction between a duct 16 and a chamber 17 in a diesel engine injector body 18. Obviously, the type of workpiece shown is merely exemplary and an arrangement similar to that illustrated in FIG. 2 would be applicable to a variety of different types of workpiece of broadly analogous configuration.

The workpiece 18 is supported within a container 19 serving to retain the electrolyte and to insure proper electrical contact between it and the work. Container 19 is connected with a positive supply line 19a as indicated.

The electrolyte is delivered from overhead tank 2 by means of a conduit 20 which connects with the upper end of a vertical dipper tube 21 made of suitable insulating material such as glass or plastic, and serving as an insulating separator according to the invention. The pipe 21 passes through a bore in the work into the chamber 17 thereof and is formed with a side opening 21a near its lower end which opening faces the junction portion to be treated in accordance with the invention.

Extending within the pipe 21 is a cathode rod 22 which is insulated from the workpiece by the pipe 21. The electrolyte is discharged by way of the duct 16 into the collector 19 and is thence recycled by gravity into the pump or storage reservoir 3 as shown in FIG. 1.

In case the work to be treated does not include a separate duct 16 as shown in FIG. 2, the electrolyte may be discharged by way of the same passage as that through which it is supplied. This can be accomplished by providing an annular space between the outer surface of the pipe 21 and the surrounding inner surface of the bore through which said pipe extends. Alternately, instead of a cathode consisting of a solid rod, a tubular cathode, arranged concentrically within pipe 21 can be applied. The electrolyte is admitted through the tubular cathode and is recycled through the peripheral annular chamber.

Figure 3:
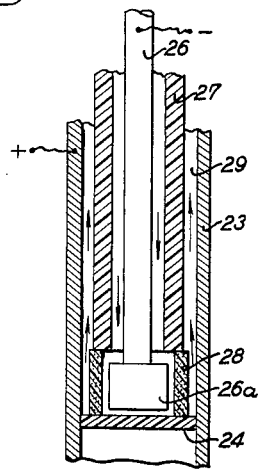
FIG. 3 is a detailed sectional view of a workpiece being treated in accordance with a further embodiment of the invention.

FIG. 3 illustrates a different embodiment of the invention as applied to the machining of the inner bore of a metal tube 23 to an accurately calibrated dimension. In this case no separate container (such as the container 19 of FIG. 2) need be provided, and the tube 23 itself is directly connected with a positive supply line 23a as indicated.

The lower end of the treating zone is defined by a disc 24 of insulating material inserted across the tube at a predetermined depth therein. Supported upon this disc coaxially with the tube is a porous annular wall 28 and this in turn supports a co-axial tube 27 of insulating material such as glass or plastic. Axially aligned in this assembly is a cathode rod 26 which terminates in a cathode enlargement section 26a within the chamber surrounded by porous wall 28. The electrolyte is supplied from the overhead tank 2 by way of the inner annular space defined between the cathode rod 26 and insulator tube 27, and is discharged through the outer annular space between said tube and the workpiece, all as indicated by the arrows.

Desirably, means are provided for imparting to the assembly comprising disc 24, porous member 28, insulator tube 27 and cathode 26a, a continuous or intermittent movement of axial translation and rotation so as to effect a uniform treatment of the inner surface of the tube.

It will be understood that the foregoing examples are illustrative only and that the invention can be embodied in different ways depending on the configuration of the work to be treated.

An electrolytic machining system constructed according to the invention includes a number of outstanding advantages.

For example, the provision of a closed flow circuit for the electrolyte achieves great economy and permits of a close control of the parameters such as temperature, current density and flow velocity.

Desirably, the electrolyte used comprises an aqueous salt solution; such electrolytes are advantageous owing to their wide applicability, ready adjustment of use conditions, and low corrosive action on the metal components of the system; further, it is pointed out that the fact that the electrolyte, directed towards a predetermined small surface to be machined, subsequently runs down the adjacent surfaces, is not detrimental to the workpiece to be treated, owing to the fact that the electrolyte is not an acid electrolyte and hence has no corrosive action.

Further, the channelling of the electrolyte according to a preferred feature of the invention makes it possible to use cathode surface areas that are substantially smaller than the anode surface areas and thus to use cathodes of small size which can be inserted into narrow spaces in the work, so that machining operations are permitted which would not be practicable with more conventional processes. The increased flow velocity of the electrolyte due to the channelling feature moreover improves the discharge of gases generated during the electrolysis as well as facilitating elimination of anodic compounds, a problem that has raised considerable difficulty in previously known electrolytic machining systems.

Further the channelling of the electrolyte according to the invention makes it possible to obtain maximum anodic dissolution. In fact, regardless the type of electrolyte used, the compounds formed by anodic dissolution will always tend to coat the anode; more precisely, in case acid electrolytes are used, said coating is viscous and is formed of a very concentrated solution in the electrolyte of metal salts, as a result of anodic dissolution; in case the electrolyte comprises aqueous salt solutions, said coating consists of hydrates. The effect of the channelling of the electrolyte is to mechanically eliminate said coating at the points of impact of the electrolyte jet. Hereinafter, the word "coating" will have the above explained generic meaning.

In accordance with the foregoing, certain types of electrolyte liquids can be used which could not heretofore be employed because of the formation of anodic compounds which tend to coat the anode and thereby prevent normal progress of the electrolytic process, bringing it to a premature stop. In the system of the invention in contrast thereto, owing to the increased and controllable flow velocity of the electrolyte in a selected working area, anodic compounds are carried away and eroded.

It is found that the surface condition of work treated by the improved process is as good as or better than what is obtained in more conventional machining methods. This is primarily due to the close control that can be exercised over factors such as current density, temperature, flow velocity and treating time, which control is greatly facilitated by the closed flow circuit.

The invention makes it possible to use higher current densities without causing local overheating and arcing. This in turn makes it possible to reduce the spacing between the cathode and workpiece and thereby to provide electrolytic machining tools of very small dimensions so that the range of applicability of electrolytic machining is greatly extended with respect to what was heretofore thought possible.

The amounts of metal removed in the improved process can be closely controlled by controlling the time of treatment. Thus, if the appropriate parameters are first adjusted so as to obtain a rate of metal removal of, say, one micron per second, the total amount of metal removed from the workpiece subsequently processed can then be accurately controlled and maintained to a uniform prescribed value by controlling the time of treatment without having to supervise the actual dimensions of the parts produced. Close tolerances can thus be adhered to in a simple and practical manner.

Figures 4, 10:
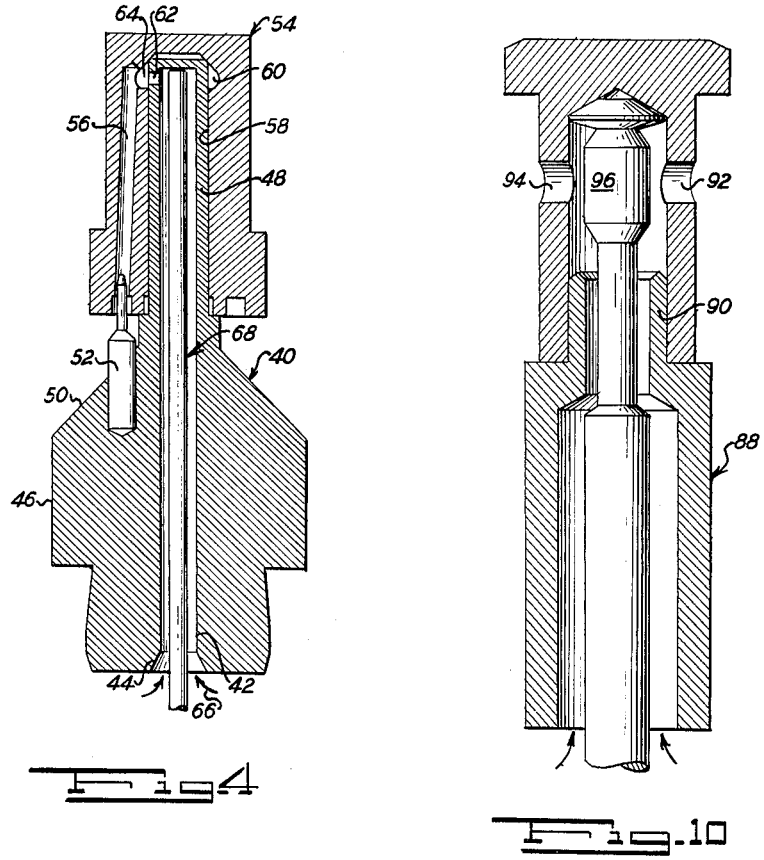
FIG. 4 illustrates still a further embodiment of the invention.
FIG. 10 illustrates still a further variation.

FIG. 4 illustrates a further embodiment of the invention according to which a diesel motor injector body is mounted on a tube provided in accordance with the invention.

The injector body which is processed according to the invention has the following composition:

| | Percent |
|---|---|
| C | 0.20 |
| Cr | 2 |
| Ni | 2 |
| Mn | 0.4–0.5 |
| S+P | <0.035 |
| Fe | Balance |

More particularly, this embodiment of the invention employs a tool 40 provided with a central bore 42 flared outwardly at the mouth 44. Tool 40 has a massive lower portion 46 at the top of which protrudes a vertical cylindrical spindle 48.

Mounted in the shoulder 50 of portion 46 is a pin 52 which performs a positioning function as will hereinafter be indicated in greater detail.

The aforesaid injector body is indicated at 54. It includes a passage 56 connected to a central bore 58 at an extremity of which is positioned an annular chamber 60. Said chamber 60 is coupled to passage 56 and at the connection of these two burrs normally result from the associated mechanical machining operation.

The vertical portion 48 is provided with a radial opening 62 corresponding with the connection 64 between the annular chamber 60 and the passage 56. Opening 62 is aligned with the opening or connection 64 by the locating pin 52 and by engagement of the latter with passage 56.

Electrolytic fluid is supplied as indicated by arrows 66 and passes upwardly through bore 42 from which it flows via opening 62.

It will appear from what has been stated above that there is a direct line of sight between the cathode 68 supported centrally in bore 42 and the burrs located at connection 64 due to the interpositioning of opening 62. It will also appear from what has been stated above that the electrolyte supplied to bore 42 will change its direction of travel at the upper extremity of bore 42 and will flow radially outwards along said line of sight until it contacts the aforesaid burrs.

By way of illustration, the electrolyte employed is an aqueous solution of sodium chloride, there being applied about 24 grams of sodium chloride per liter of water. A wetting agent such as glycerine may be employed, for example, in the amount of 22 grams per liter of water. The pH of the solution is, for example, 6.8.

The use of the aforesaid aqueous solution of sodium chloride causes a coating to be formed on the metallic surfaces of the workpiece which are exposed to the solution and immersed therein in the same manner as a workpiece is immersed in an electrolytic bath (this being distinguished from jet applications of electrolyte). The speed of flow of the electrolyte is such as to erode the coating along the line of sight so as to expose the same for electrolytic treatment. Since the amount of erosion can be controlled by dimensioning the opening 62, a very close control of the machining operation is possible. The speed of flow of the electrolyte, which is sufficient to cause the necessary erosion, is found to lie preferably between 0.1 and 0.8 meter per second; this range of speeds corresponds to the appropriate speed to be imparted to the electrolyte between the electrodes, on the one hand, in order to avoid a loss of ions in the electrolyte upon contact-making with the electrodes as a result of the electrolytic reaction in consideration of the low mobility of the ions in an electric field which can be industrially applied to the electrodes; the FIGURE 5 explains which is just said, this figure being a chart indicating the effect of the electrolyte speed (in ordinates) on the current intensity through this electrolyte (in abscissae), this chart showing that the range 0.1–0.8 meter per second is sufficient to obtain an industrial electrolytic effect with a current intensity correspondingly varying between 310 and 460 ma. On the other hand, the cited range of electrolytic speeds corresponds to the appropriate speed to be imparted in order to mechanically eliminate anodic dissolution compounds. If, in some cases, the coating of anodic dissolution compounds is formed in rather inaccessible spots, it might be necessary to exceed the speed of 0.8 meter per second of the electrolyte flow, in order to thus obtain mechanical elimination of these compounds; one might thus even arrive at speeds in the order of some meters per second.

The temperature of the electrolyte is very easily maintained inasmuch as said electrolyte can be readily cooled or heated as necessary externally of the workpiece. The temperature of the electrolyte is preferably maintained between about 20–30° centigrade, as below this temperature range current density will fall off and above this temperature range there may be evaporation phenomena in the electrolyte by reason of heat dissipated in the work zone.

By controlling the voltage in view of the above parameters, the density of the current along the aforesaid line of sight can preferably be maintained between about 5,000 and 10,000 amperes per square decimeter. The voltage is preferably a low voltage in the order of say 15 volts but may vary rather widely within a range, for example, between about 4 and 40 volts.

FIG. 6 is a chart comparing current intensity with concentration of the electrolytic solution. Assuming the aforesaid solution to represent a concentration of 100%, the chart shows concentrations of 75, 50 and 25% which correspond respectively to the addition of 25, 50 and 75% water.

As can be seen from the chart, current intensity levels off at a concentration of about 100% so that greater concentrations do not provide for corresponding increases in current intensity.

The aforesaid chart was plotted for the apparatus of FIG. 4 employing a voltage of 15.5 volts and an electrolytic temperature of 20° centigrade. The ordinate of the chart is measured in current intensity between the cathode 68 and the workpiece 54.

Figure 7:
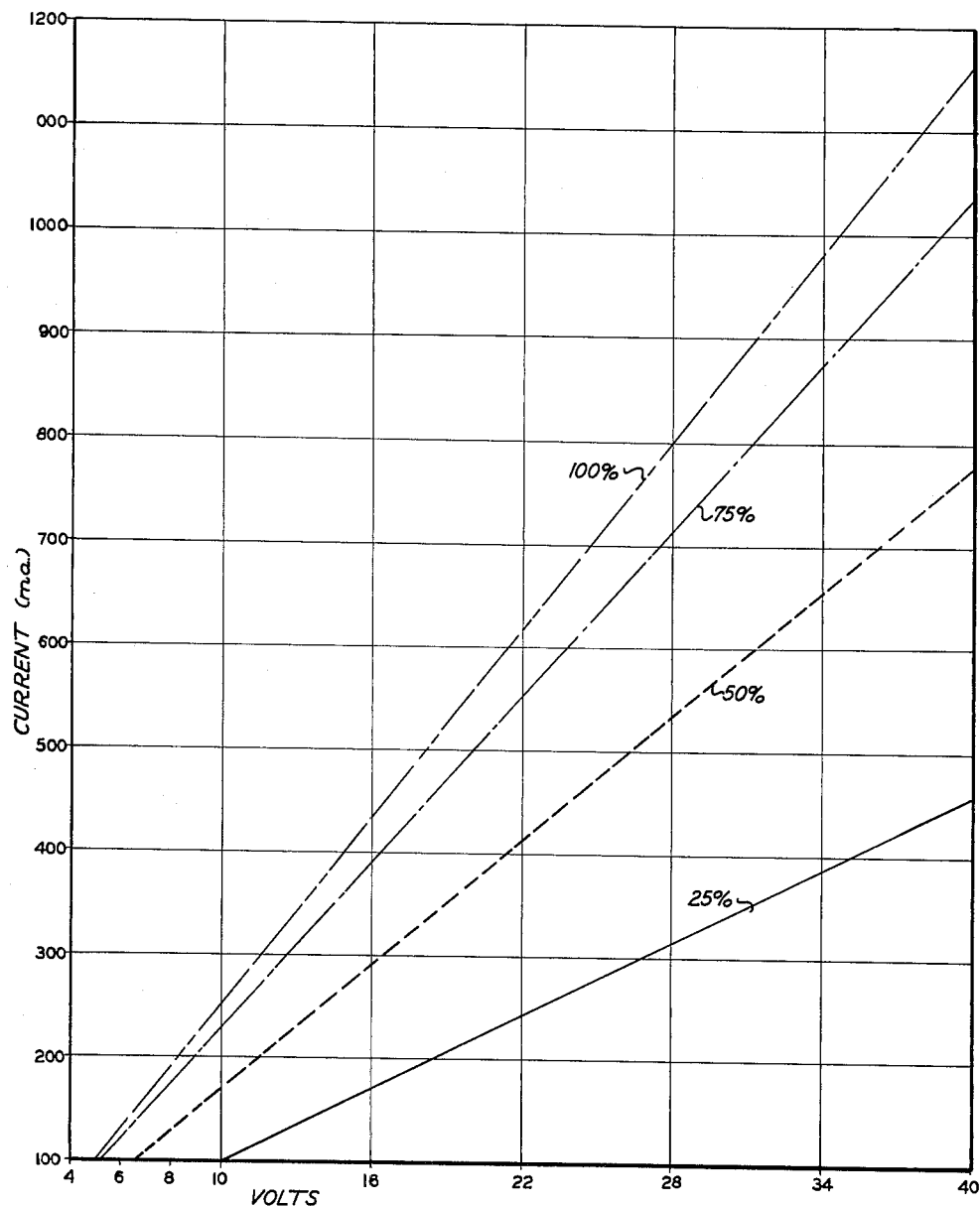

The chart of FIG. 7 compares current intensity with voltage applied between the electrode with an electrolyte temperature of about 23° C. Four curves were plotted for the different concentrations of FIG. 6.

Each of the curves is a straight line curve illustrating that the electrolyte used according to the process of the invention behaves as a resistive element according to Ohm's law.

This result is contrary to what is generally observed with conventional polishing electrolytes, the curve for which is shown in FIG. 8 wherein the abscissa is voltage applied and the ordinate is current intensity. In this latter figure, the curve is shown with a plateau portion 70 corresponding to the formation of a viscous layer at the surface being worked. Such a viscous layer does not occur in processes of the invention by reason of the impact of the stream of electrolyte against the portion being machined.

Figure 9:
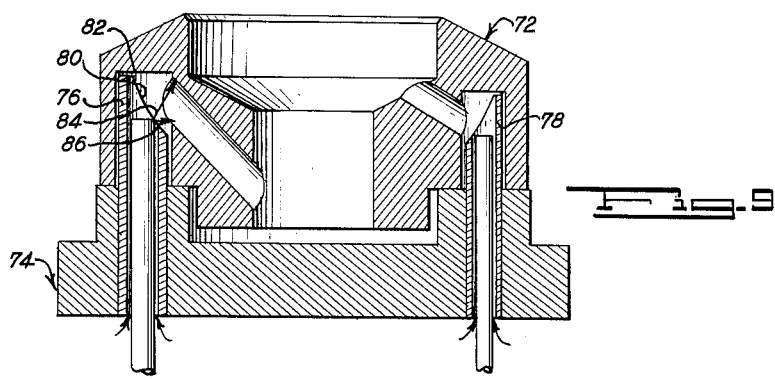
FIG. 9 illustrates a variation in machining a workpiece in accordance with the invention.

FIG. 9 illustrates a further embodiment of the invention wherein the part 72, which is to be electrically machined, is of the following composition:

| | Percent |
|---|---|
| Al | 3.9 to 4.3 |
| Cu | 0 to 0.10 |
| Mg | 0.03 to 0.06 |
| Zn | Balance |

This embodiment of the invention employed an electrolyte of the above indicated nature circulated along the aforesaid line of sight at a speed of 0.15 meter per second.

The illustration of FIG. 9 is intended to illustrate that under certain conditions it is not necessary to provide an opening in the screen between the cathode and the workpiece which opens exclusively in a radial direction.

More particularly, the apparatus of FIG. 9 and the workpiece cooperatively comprise a base 74 at the top of which is positioned the aforesaid workpiece 72. Screens 76 and 78 are employed, the screen 76, for example, including an opening 80 at the upper extremity being confined by the surface 82 of the workpiece itself.

This embodiment of the invention, nevertheless fills the other requirements of the technique of the invention in that a line of sight is provided between the burrs and the cathode, such lines of sight being indicated by reference characters 84 and 86.

Thus, the embodiment of FIG. 9 employs the characteristic features of the invention in that an electrolyte is employed which deposits a coating on the surfaces of the workpiece immersed therein while at the same time eroding this coating in the areas which are to be electrolytically machined.

FIG. 10 illustrates a still further embodiment of the invention for deburring a hydraulic coupling of conventional steel having a composition as follows:

| | Percent |
|---|---|
| C | 0.10 |
| Mn | 0.5 |
| S | 0.2 |
| Fe | Balance |

The electrolyte employed in this embodiment of the invention may be the same as indicated above, which in actual operation has been circulated at a speed of 0.2 to 0.25 meter per second.

In this embodiment of the invention the tool 88 has an upwardly extending screen 90 which terminates well below the openings 92 and 94, the perimeters of which are to be deburred.

Nevertheless, it appears that a direct line of sight is provided between the cathode 96 and openings 92 and 94 so that an erosion of the electrolytic coating can be effected in order to provide for the machining of the invention.

From what has been stated above, it will appear that the invention proposes exposing a limited portion of a metallic part to a cathode along a determinable line of sight and applying an electrolytic potential between this part and the cathode, the technique further comprising directing a flow of electrolyte from the cathode towards said portion of the metallic part along the said line of sight. The proposed use of the electrolyte involves abrading or eroding a coating which is formed by the electrolyte (on the surface being worked) whereby it is possible to erode metal from the associated workpiece in a closely determined zone.

The invention involves both an immersion of a metallic surface in an electrolyte as contrasted to the application of a jet without collecting the electrolyte at the surface being worked and further involves the erosion of the coating formed on the surface.

The preferred parameters of the process have been indicated above by way of example but can be determined for the benefit of this text for any particular situation by those skilled in the art.

There will now be obvious many modifications and variations of the processes set forth above. These modifications and variations will not, however, depart from the scope of the invention if defined by the following claims.

What is claimed is:

1. A system for machining a metallic workpiece by anodic dissolution comprising an elongated cathode electrode, an anode electrode, said anode electrode being constituted at least in part by said workpiece, a source of electrolyte, conduit means defining a flow circuit for said electrolyte from said source to said workpiece and back to said source, and an elongated generally cylindrical insulating envelope provided with at least one orifice and positioned between said electrodes for guiding the flow of said electrolyte through the orifice, said envelope completely surrounding and being spaced from at least the cathode electrode to define a space into which said conduit means delivers said electrolyte, said orifice being disposed in a side wall of said envelope opposite said workpiece for guiding electrolyte towards a selected portion thereof which is to be machined, said envelope isolating the electrodes except at the orifice whereat the electrodes are in facing relation, said orifice being positioned in the envelope to deliver the electrolyte against said workpiece with a component of velocity normal to the workpiece, said conduit means including means subjecting said electrolyte to forced flow whereby to direct said electrolyte with substantial velocity against said workpiece.

2. A system according to claim 1 in which said insulating envelope comprises at least one portion composed of a porous wall.

3. A system according to claim 1 in which said conduit means includes a filter separation device.

4. A system for machining a metallic workpiece by anodic dissolution comprising an elongated cathode electrode, an anode electrode, one of said electrode being constituted at least in part by said workpiece, a source of an electrolyte, conduit means defining a flow circuit for said electrolyte from said source to said workpiece and back to said source, and an elongated generally cylindrical insulating envelope provided with at least one orifice and positioned between said electrodes for restricting the flow of said electrolyte and guiding the latter through the orifice, said envelope completely surrounding and being spaced from at least the other of said electrodes to define a space into which said conduit means delivers said electrolyte, said orifice being disposed in a side wall of said envelope opposite said workpiece and facing the same at a location at which the electrodes are also in facing relation such that electrolyte is delivered against said workpiece after passage through the orifice, said conduit means including means subjecting said electrolyte to forced flow through said conduit means and between said envelope and the other said electrode whereby to direct said electrolyte against said workpiece with a component of velocity normal to the workpiece.

5. A machining process comprising completely surrounding an elongated electrode with an elongated insulating member to define an elongated annular chamber and providing in continuation of said chamber a radial path extending through an opening in a side wall of the chamber outwardly from said electrode past said insulating member, encircling the insulating member with an electrically conductive tubular element which is to be machined, the tubular element facing the electrode at said radial path, applying an electrolytic potential between said element and said electrode, passing an electrolyte through said chamber along said electrode and then radially outward along said path toward said element to machine the same in the region of said path and collecting the electrolyte within said element to immerse the element therein, said electrolyte forming a coating on said element and the coating being eroded in said path whereby the machining is controlled by electrolyte flow which causes erosion of the coating in said path and by exposure of the element to said electrode.

6. A method as claimed in claim 5 wherein said electrolyte is an aqueous salt solution.

7. A method as claimed in claim 6 wherein said electrolyte is an aqueous solution of sodium chloride containing a wetting agent.

8. A method as claimed in claim 6 wherein said electrolyte is at a temperature of about 20 to 35° C.

9. A method as claimed in claim 6 wherein said electrolyte is directed towards said workpiece at a speed of about 0.1 to 0.8 meter per second.

10. A method as claimed in claim 6 wherein said electrolyte develops a current density between said electrodes of between 5,000 to 10,000 amperes per square decimeter.

11. A machining process comprising positioning an electrode within an insulating member which completely surrounds the electrode to define an elongated chamber and providing an orifice in a side wall of the insulating member to define in continuation of said chamber a path extending from said electrode through said insulating member, arranging an electrically conductive element in said path in facing relation with the electrode via said path, applying an electrolytic potential between said element and said electrode, passing an electrolyte through said chamber along said electrode and along said path toward said element, said electrolyte being such as to form a coating on said element, and collecting the electrolyte at said element to immerse the element therein, movement of the electrolyte along said path eroding the coating solely in the vicinity of said path to expose the element to said electrode.

References Cited by the Examiner

UNITED STATES PATENTS

| | | | |
|---|---|---|---|
| 1,866,699 | 7/1932 | Conlin | 204—224 X |
| 2,764,540 | 9/1956 | Farin et al. | 204—224 |
| 2,859,157 | 11/1958 | Curtiss | 204—224 |
| 3,095,364 | 6/1963 | Faust et al. | 204—224 X |

FOREIGN PATENTS 335,003   9/1930   Great Britain.

WINSTON A. DOUGLAS, *Primary Examiner.*

JOHN H. MACK, ALLEN B. CURTIS, *Examiners.*